United States Patent
Kim

[11] Patent Number: 6,164,703
[45] Date of Patent: Dec. 26, 2000

[54] EXHAUST COUPLER

[75] Inventor: Dae-Hyun Kim, Ansan, Rep. of Korea

[73] Assignee: SJM Co., Ltd., Rep. of Korea

[*] Notice: This patent is subject to a terminal disclaimer.

[21] Appl. No.: 09/211,031

[22] Filed: Dec. 14, 1998

[30] Foreign Application Priority Data

Jan. 20, 1998 [KR] Rep. of Korea .......... 98-1569

[51] Int. Cl.⁷ ............................................. F16L 27/10
[52] U.S. Cl. ............................. 285/49; 285/300; 285/226
[58] Field of Search ............... 285/49, 300, 299, 285/298, 137.1, 227, 226

[56] References Cited

U.S. PATENT DOCUMENTS

| | | | |
|---|---|---|---|
| 4,659,117 | 4/1987 | Holzhausen et al. | 285/49 |
| 4,875,716 | 10/1989 | Wizen et al. | 285/137.1 |
| 5,358,287 | 10/1994 | Winzen | 285/227 |
| 5,437,479 | 8/1995 | Hartling et al. | 285/300 |
| 5,797,628 | 8/1998 | Kuhn | 285/226 |
| 5,967,565 | 10/1999 | Kim | 285/49 |

FOREIGN PATENT DOCUMENTS

| | | | |
|---|---|---|---|
| 0 507 666 A1 | 10/1992 | European Pat. Off. | F16F 1/36 |
| 0 791 731 A1 | 1/1997 | European Pat. Off. | F01N 7/18 |
| 36 27 363 a1 | 8/1988 | Germany | F16L 27/04 |
| 43 17 334 C1 | 5/1993 | Germany | F01N 7/08 |
| 195 30 011 A1 | 1/1997 | Germany | F16L 27/107 |
| 2278413 | 11/1994 | United Kingdom . | |
| 2278901 | 12/1994 | United Kingdom . | |

Primary Examiner—Lynne H. Browne
Assistant Examiner—Tomlyne A Malcolm
Attorney, Agent, or Firm—Daniel McCarthy; Jaiwook Lee

[57] ABSTRACT

This invention relates to a decoupler for the exhaust pipes of automobile. The preferred decoupler includes a conduit-type sleeve (10); a conduit-type cover member (20) generally covering the sleeve (10); a guiding member (30) extended from the end of the cover member (20), the guiding member serving to accommodate a bending articulation or radial displacement of the decoupler; an inner retainer pocket (40) having a rim (41) engaged in the outer surface of said sleeve (10), wherein said rim is extended circumferentially and forms a first pocket (42) with said guiding member (30); an outer retainer member (50) having an enlarged diameter area (40) and forming a second pocket (52) with said guiding member (30); buffering members (60) (61) located in the pockets (42) (52); and a bellows (70) fixably engaged between said inner retainer member (40) and said cover member (20), wherein said bellows (70) prevents leakage of gas therein and absorbs the elastic and bending displacement, to allow said guiding member (30) to slide during bending articulation of buffering members (60) (61).

Moreover, the present invention can minimize the effect of bending displacement on the engine because the invented decoupler absorbs vibration and accomodates bending displacement. In addition, the present invention can increase parts life and riding comfort.

20 Claims, 6 Drawing Sheets

EXHAUST COUPLER

Priority is claimed to U.S. patent application Ser. No. 09/026,625 filed on Feb. 20, 1998, now U.S. Pat. No. 5,967,565, and to Republic of Korea Patent Application Serial Number 1998-1569 filed on Jan. 20, 1998.

BACKGROUND

1. The Field of the Invention

This invention relates to an exhaust coupler for motor vehicles, and more particularly, to novel systems and methods for effectively absorbing bending and elastic displacement during running of a motor vehicle in order to minimize the effect of displacements to the engine on the exhaust system and for prolonging the useful life of vehicle parts.

2. The Background Art

There is a recent trend toward manufacture of vehicles with larger engines. Use of a larger engine in a vehicle increases engine roll vibration. Engine roll vibration is particularly severe when starting the engine, when shifting gears, and when the vehicle is suddenly stopped or started. These vibrations are directly delivered to the exhaust pipe which can be easily damaged if a proper coupling device is not used. Moreover, the exhaust pipe itself also exposed to distortion and stress caused by the road conditions.

Typically, a coupler (D) is installed to reduce and to absorb vibration, stress and heat expansion. As shown in FIG. 1, the decoupler D is usually installed between the engine (1) and the exhaust pipe (2), the exhaust pipe (2) being connected to a muffler (3) in order to emit the exhaust gas. However, the coupler and the exhaust pipe are often supported by a minimum number of lightweight hanger mounts. Therefore, the coupler installed between the engine and the exhaust pipe should have enough strength to support the coupler itself and the weight of the exhaust pipe, and also should have enough flexibility to absorb displacement between the engine and the exhaust pipe. In addition, the coupler also must be compact in order to be inserted between the engine and the exhaust pipe.

A number of attempts have been made in the prior art to design an effective coupler. One attempt to solve the problems of the prior art was demonstrated by an English patent, GB2,277,969A which forcefully determines a bending center to absorb bending stress. As shown in FIG. 6, an inner sleeve (6) is overlapped with an outer sleeve (5) with a space therebetween. The outer sleeve (5) has a wider diameter than the inner sleeve and the edge of the outer sleeve is bent inwardly. Meanwhile, the inner sleeve (6) has a circular notch (7) which has a smaller diameter than the wider diameter of the outer sleeve. A buffering member (8) is engaged in the pocket formed on both sides of the notch (7). A bellows (9) surrounds the cylindrical area of the inner sleeve (6). One side of the bellows (9) is attached to the surface between the bent area of the outer sleeve and the buffering member. The other side of the bellowS is attached to the surface of the inner sleeve. The bending center (C) is formed approximately at the center of the overlapping area. The buffering members and the bellows are designed to absorb axial displacement and bending displacement. Typically, axial displacement is caused by vibration of the engine or impact due to road conditions. Bending displacement is generally caused when the axis of the inner sleeve and the axis of the outer sleeve cross each other at an angle.

The prior art has some disadvantages which are generally recognized in the industry. The bellows (9) of the previous technology is exposed to the open air, so it can easily be damaged when a rock or other loose object hits it. And high temperature of the bellows, due to exposure to exhaust gases, accelerates oxidation of the bellows. Consequently, the prior art has low durability and a short lifetime.

Moreover, allowable bending displacement in prior art devices is very narrow because the displacement center (C) is positioned at the middle of the buffering member (8). The allowable displacement is limited by the height of the notch and the gap formed between the bent area of the outer sleeve and the inner sleeve below the bent area. When a sudden strong stress requiring large displacement is imposed, the inner sleeve (6) has to strike either the tip of the bent area or the outer sleeve. As a consequence, the area experiencing the collision become weak, causing shape deformation of the part or a hole in the structure. Moreover, the process of corrosion is accelerated because of the high temperature of the exhaust gas passing inside of the sleeves.

In addition, in the prior art, bellows (9) is easily damaged by impacts of the tip of bent area, resulting in a significantly shortened lifetime of the structure. Because the applicable range of motion of the prior art decoupler is limited, a different size decoupler was needed each different automobile model.

Those skilled in the art have also tried to increase the number of pleats in the bellows, consequently increasing the length of the decoupler, therefore requiring use of high quality materials in order to achieve a durable part. Such structures have not been economically feasible, however.

BRIEF SUMMARY AND OBJECTS OF THE INVENTION

In view of the foregoing, it is a primary object of the present invention to provide an exhaust coupler which is capable of accommodating large angular displacement.

It is also an object of the present invention to provide an exhaust coupler which can conveniently be installed between the engine and the exhaust pipe in a variety models of vehicle.

It is a further object of the invention to provide an exhaust coupler that absorbs engine roll vibration, shock due to road conditions, angular displacement and axial displacement.

It is a further object of the invention to provide a compact, lightweight and economical exhaust coupler.

Consistent with the foregoing objects, and in accordance with the invention as embodied and broadly described herein, a superior exhaust coupler is disclosed. The preferred coupler includes: a sleeve (10) through which exhaust gas may, a cover member (20) which is connected to the exhaust pipe (2) from the opposite end of the sleeve (10), a guiding member (30) extended and bent inwardly from the cover member (20) to guide bending displacement, an inner retainer member (40) engaged in the outer surface of the sleeve (10) and forming a first pocket member (42) between a rim (41) of the inner retainer member (40) and the guiding member (30), an outer retainer member (50) engaged in the outer surface of the inner retainer member (40) and extended to a larger diameter to form a second pocket member (52) with the guiding member (30), ring-shaped buffering members (60) (61) filling the first pocket member (42) and the second pocket member (52) respectively, and a bellows (70) of which one end is engaged in the inner retainer member (40) and the other end is engaged in the cover member (20) to retain the exhaust gas inside and to absorb axial displacement and bending displacement. Accordingly, the present invention accommodates a large degree of bending displacement which occurs among the guiding member (30) and the buffering members (60) (61). Moreover, the present invention can effectively absorb bending displacement to minimize the effect to the engine, increase the overall lifetime of the exhaust pipe and also increase passenger comfort.

The foregoing and other objects and features of the present invention will become more fully apparent to persons of ordinary skill in the art from the following description and appended claims, taken in conjunction with the accompanying drawings.

BRIEF DESCRIPTION OF THE DRAWINGS

Understanding that these drawings depict only typical embodiments of the invention and are, therefore, not to be considered limiting of its scope, the invention will be described with additional specificity and detail through use of the accompanying drawings in which.

DETAILED DESCRIPTION OF THE PREFERRED EMBODIMENTS

It will be readily understood that the components and steps of the present invention, as generally described and illustrated in the Figures herein and accompanying text, could be arranged and designed in a wide variety of different configurations while still utilizing the inventive concept. Thus, the following more detailed description of the preferred embodiments of the system and method of the present invention, as represented in the Figures and accompanying text, is not intended to limit the scope of the invention, as claimed, but it is merely representative of the presently preferred embodiments of the invention.

The presently preferred embodiments of the invention will be best understood by reference to the drawings, wherein like parts or steps are designated by like numerals throughout.

Figure 1:
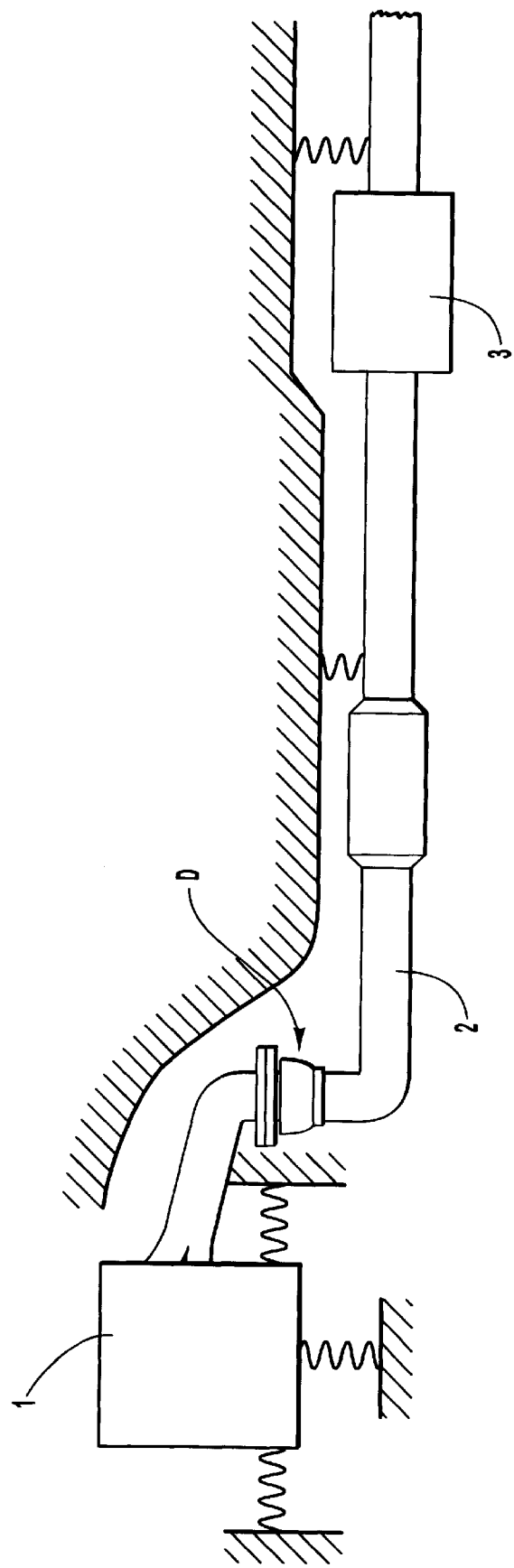
FIG. 1 is a prospective view of the present invention, showing a preferred location for installation.

Referring to FIG. 1, the coupler (D) connects the engine (1) to the exhaust pipe (2) which has a muffler at the other end. The vibration of the engine is directly transmitted to the exhaust pipe (2) which is held by several supports attached to the vehicle body. Without the coupler being attached between the engine and the exhaust pipe, the vibration of the engine is transmitted to the exhaust pipe and eventually to the vehicle body through the supports. Therefore, it is critical to use the coupler to prevent the engine vibration being transmitted to the body and also any displacement being delivered to the engine.

Figure 2:
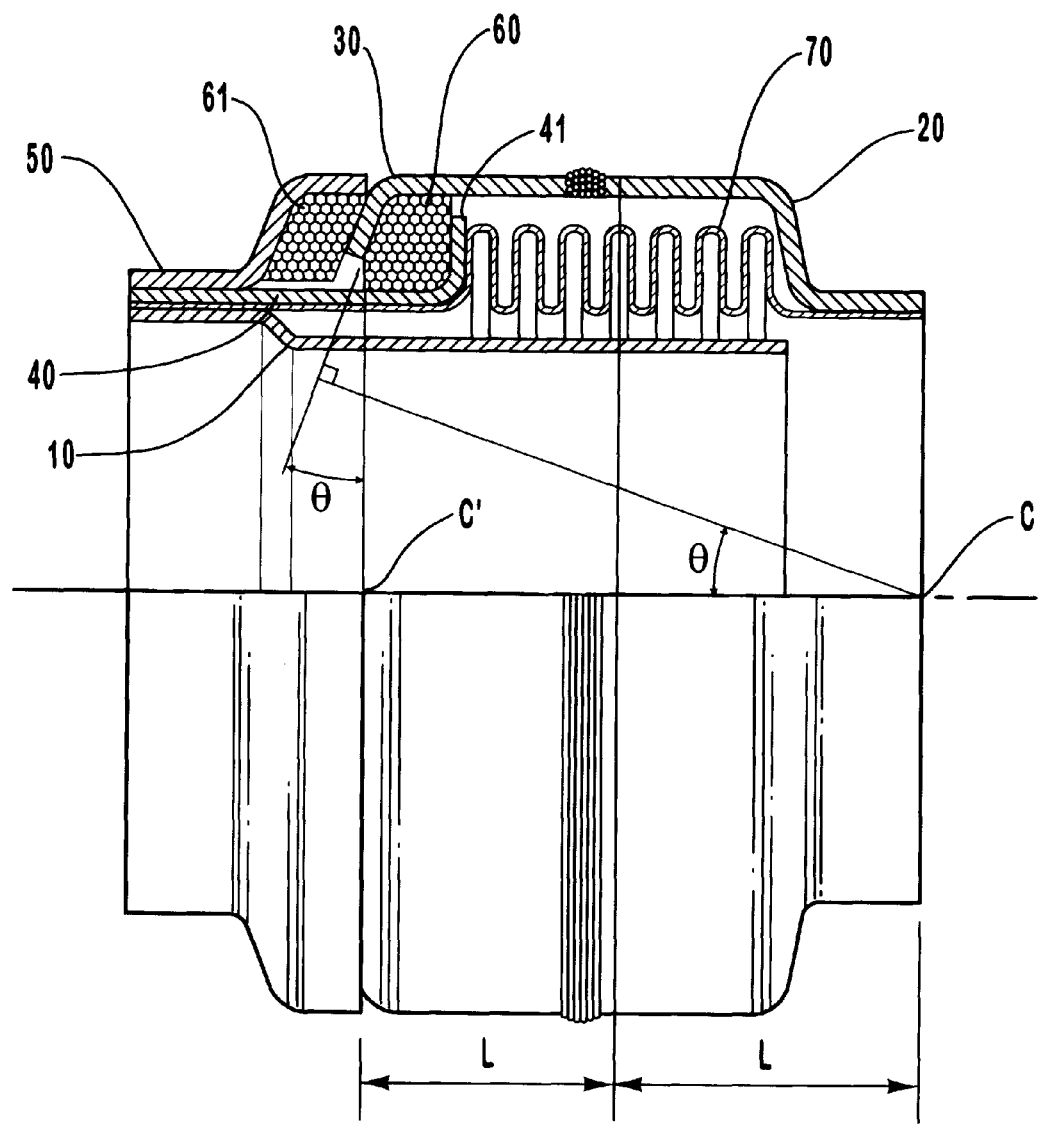
FIG. 2 is a semi cross-sectional view of a preferred embodiment of the present invention.

Now referring to FIG. 2, the sleeve (10) is preferably a cylindrical shape with two different diameters. One side of the sleeve has a larger diameter conforming to the size of the outlet of an engine and the other side has a smaller diameter which is formed to help assemble other parts of the invention. However, the diameter of the smaller size is preferably a bit smaller than the larger diameter. If the smaller diameter is too small, the flow of exhaust gas in the smaller diameter becomes fast and creates lower pressure on the outlet of the engine due to the Bernoulli effect.

Generally covering the smaller side of the sleeve (10) is a cover member (20) of which one end has a diameter conforming to the exhaust pipe and the other end has a larger diameter to surround the sleeve (10) and a bellows (70). Preferably, the end of the smaller size diameter of the sleeve and the area of the cover member (20) that bends to compactly cover the bellows generally meet on the same vertical line. The sleeve is preferably a short cylindrical shape extended to the other end of bellows for exhaust gas to be pass through.

A guiding member (30) is an extension of the covering member (20). One end of the guiding member (30) has a bend, and the other end is preferably attached to the end of the cover member (20) as shown in FIG. 2. The area where the cover member (20) and the guiding member (30) is preferably welded circumferentially. However, other means of connecting the two pieces may be used to seal the gap between the cover member (20) and the guiding member (30), such as glue or clamps. Alternatively, the two pieces can be formed as one piece. However, welding is a preferable embodiment of the present invention because of the convenience of assembly.

Still referring to FIG. 2, an inner retainer (40) having a fitting diameter for the sleeve (10) has a flange-shaped rim (41) which is extended outwardly. Similarly, an outer retainer (50) having a fitting diameter sized for the inner retainer (40) is extended outwardly and again extended to the axial direction of the cylinder. The ends of the sleeve (10), inner retainer (40) and the outer retainer (50) are aligned together as shown in FIG. 2 and are fixably engaged altogether by pressing or welding. Other proper means of sealing known to those skilled in the art may be used to seal off the present invention at one end.

Figure 3:
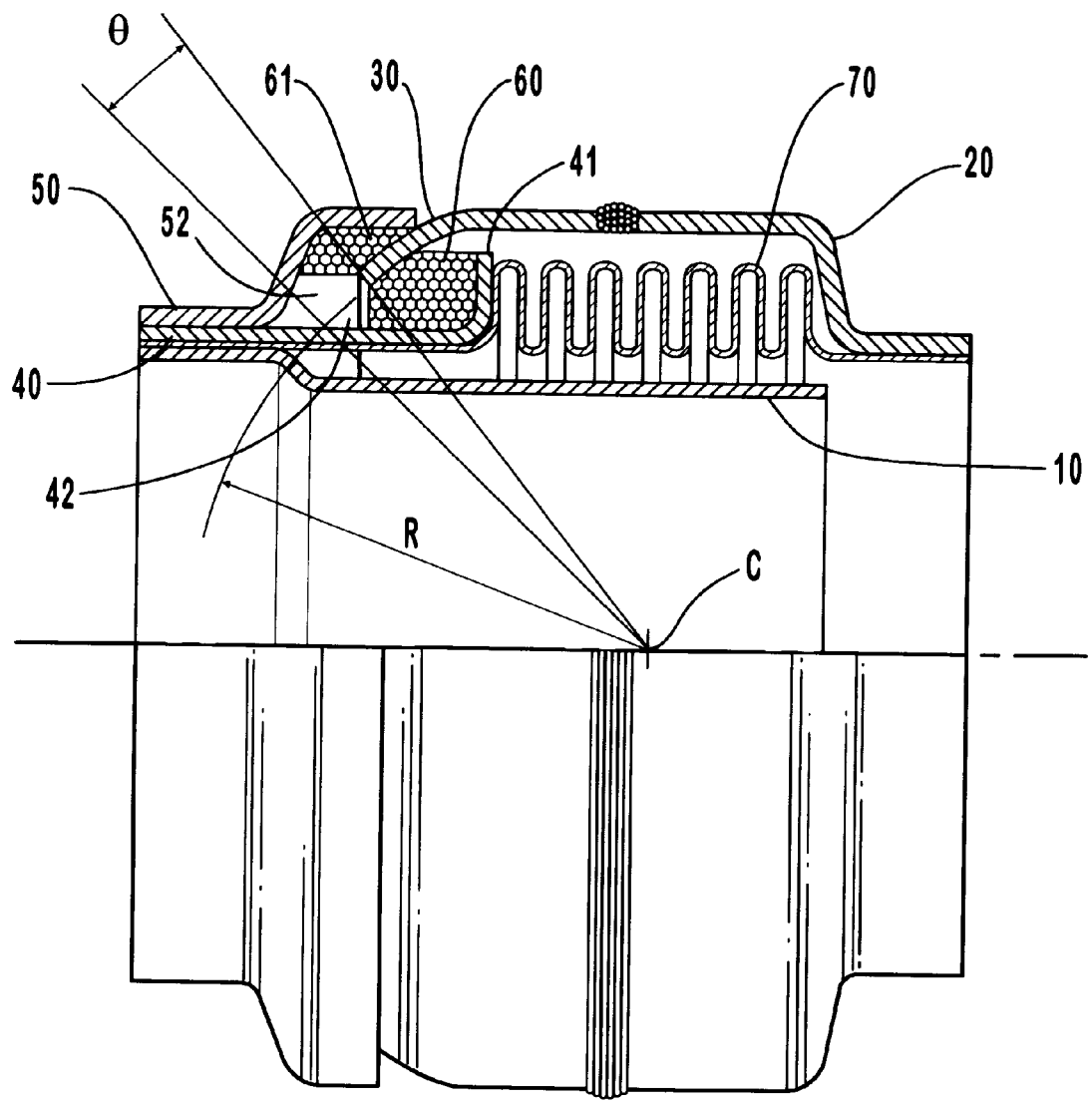
FIG. 3 is a semi cross-sectional view of another preferred embodiment of the present invention.

The guiding member (30) is insertly engaged between the ends of the inner retainer member (40) and the outer retainer member (50) to form two pockets on either side of the guiding member (30). As shown in FIG. 2 and FIG. 3, a first pocket (42) is formed between the guiding member (30) and the rim of the inner retainer (40). Likewise, a second pocket (52) is formed between the guiding member (30) and the outer retainer (50). Filled in the first pocket (42) and the second pocket (52) are buffering members (60) and (61) respectively.

The buffering members (60)(61) are made of a resilient material to effectively absorb the stress from the engine vibration and the road condition. At the same time, the buffering members (60)(61) preferably absorb the axial displacement and the bending displacement. The buffering members (60)(61) are generally formed in a ring shape and inserted in the first pocket (42) and the second pocket (52). Preferably, the material for the buffering members is generally elastic enough to recover the original shape when the stress is released. Therefore, the material is preferably made of compressed thin iron net in a ring shape to have perpetual resilience and for work convenience.

In the present invention of the coupler, the contacting surface of the buffering members (60) (61) constantly rubs against the guiding member (30), so it is preferable to lubricate the contacting surfaces with carbon or other proper lubricating materials known to those skilled in the art. Other proper surface treatments are also possible.

Still referring to FIG. 2 and FIG. 3, one end of the bellows (70) is preferably fixably engaged between the inside of the inner retainer member (40) and the outside of the sleeve (10), and the other end of the bellows (70) is also fixably engaged on the inside of the covering member (20). Both ends of the bellows (70) are fixably engaged by welding or pressing. However, other proper means for attaching the bellows (70) are also possible. By having both ends of the bellows (70) being sealed, the exhaust gas passing through the present invention is blocked from escaping.

The bellows (70) absorbs axial displacement and bending displacement of the coupler, whether that displacement is caused by engine roll vibration, road shock, gear shifting, heavy acceleration, stopping the automobile or other causes. As shown in FIG. 2 and FIG. 3, the bellows (70) is formed in a repeatedly corrugated shape so that it can readily accommodate both axial displacement and bending displacement, with the design being such as to mainly target axial displacement. The bellows (70) readily returns to its original shape when the external force causing displacement is removed.

As previously described, the present invention of the coupler can accomodate a greater bending displacement than the prior art. This particular feature of the present invention can be shown by referring the displacement angle in FIG. 2. The bending displacement centered in the displacement center (C) is absorbed by bellows (70) and buffering members (60) (61). The angle of the bend of the guiding member with respect to the vertical is preferably the same as the displacement angle which is measured at the bending displacement center (C), and preferably formed at the end of the cover member of the present invention.

Another displacement center (C') is the compression displacement center which is preferably located at the center of the bend area of the guiding member (30) on the axis of the present invention. It is preferable to design the center of the bellows (70) at the midpoint of the distance between the compression displacement center (C') and the bending displacement center (C). The buffering members (60) (61) in this preferred embodiment have less density to increase the elastic buffering effect. This preferred embodiment is proper when the bending absorption is relatively small and the damping effect from the weight stress is required.

Figure 4:
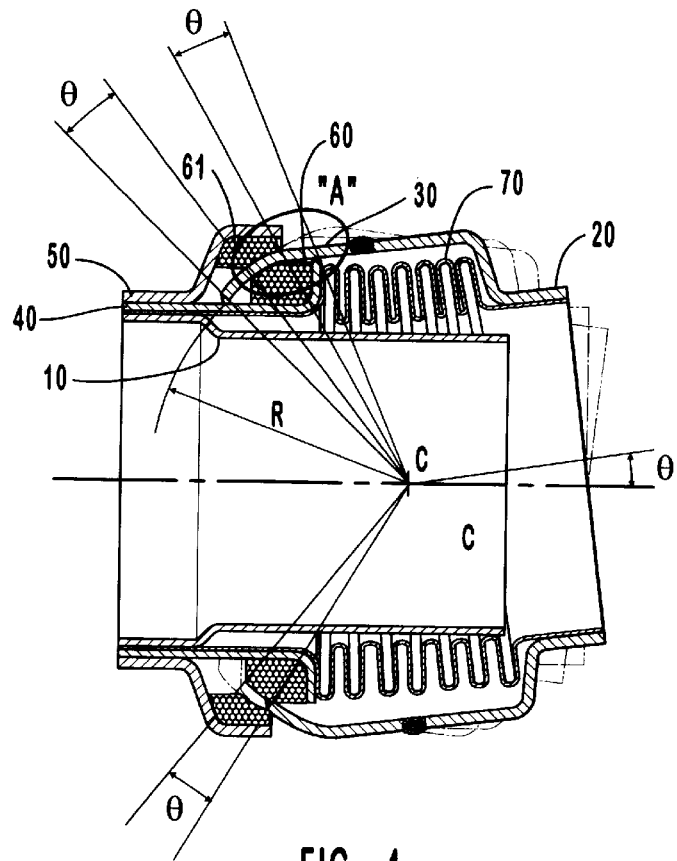
FIG. 4 is a cross-sectional view of the invention, showing the variable angle of FIG. 3.
Figure 5:
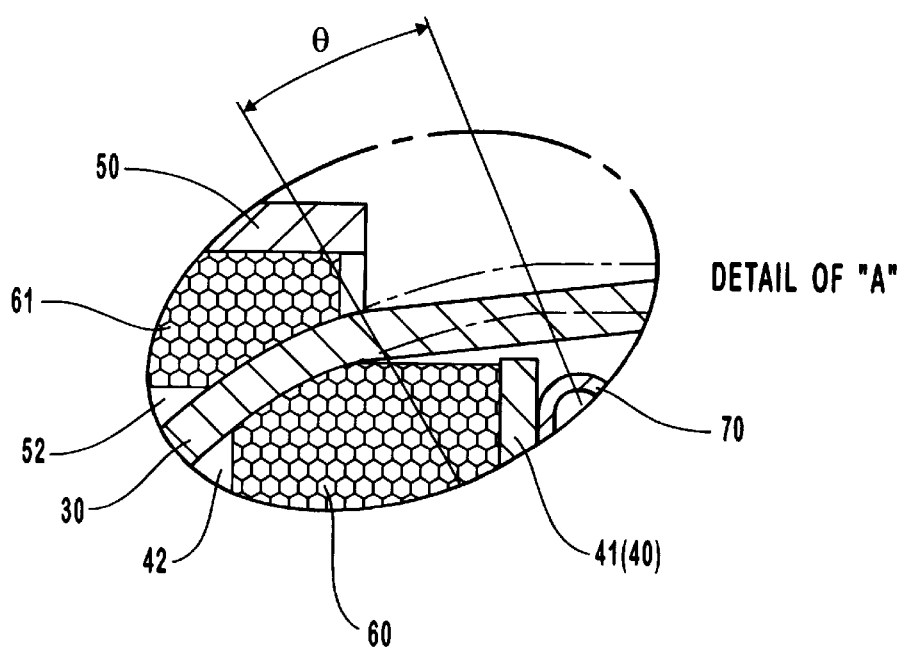
FIG. 5 is an enlarged view of section "A" of FIG. 4.
Figure 6:
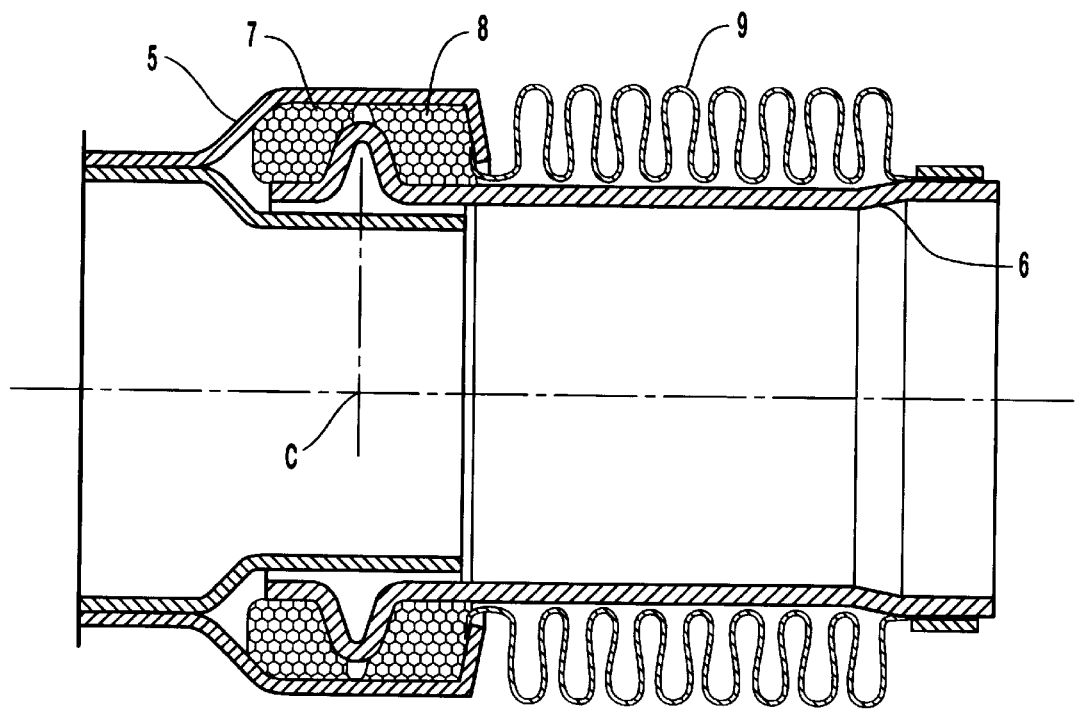
FIG. 6 is a cross-sectional view of the prior art.

FIG. 3 through FIG. 5 depict an alternative preferable embodiment of the present invention, showing a different arrangement of the guiding member (30). This embodiment of the present invention has better adaptation to a bending motion. In this embodiment, the guiding member (30) is formed on the circle having the displacement center (C) with a diameter R. The displacement center (C) is designed to be positioned at the midpoint of the bellows (70) along the axis of the exhaust pipe. When a bending displacement is applied, the guiding member (30) moves along an arc of a circle centered at the displacement center (C). Therefore, the guiding member (30) does not have much physical contact with the buffering members (60) (61) and only the sliding friction is applied. However, the tip of the guiding member (30) is preferably rounded to prevent shearing of the buffering members (60)(61) while the guiding member (30) is moving between the buffering members.

In this embodiment, the buffering members (60) (61) positioned on both sides of the guiding member (30) provides a buffering effect to weight stress along the direction of tensile and compression which are occurred by large motion of the engine. Moreover, the buffering members (60) (61) guide the sliding of the guiding member (30).

Figure 7:
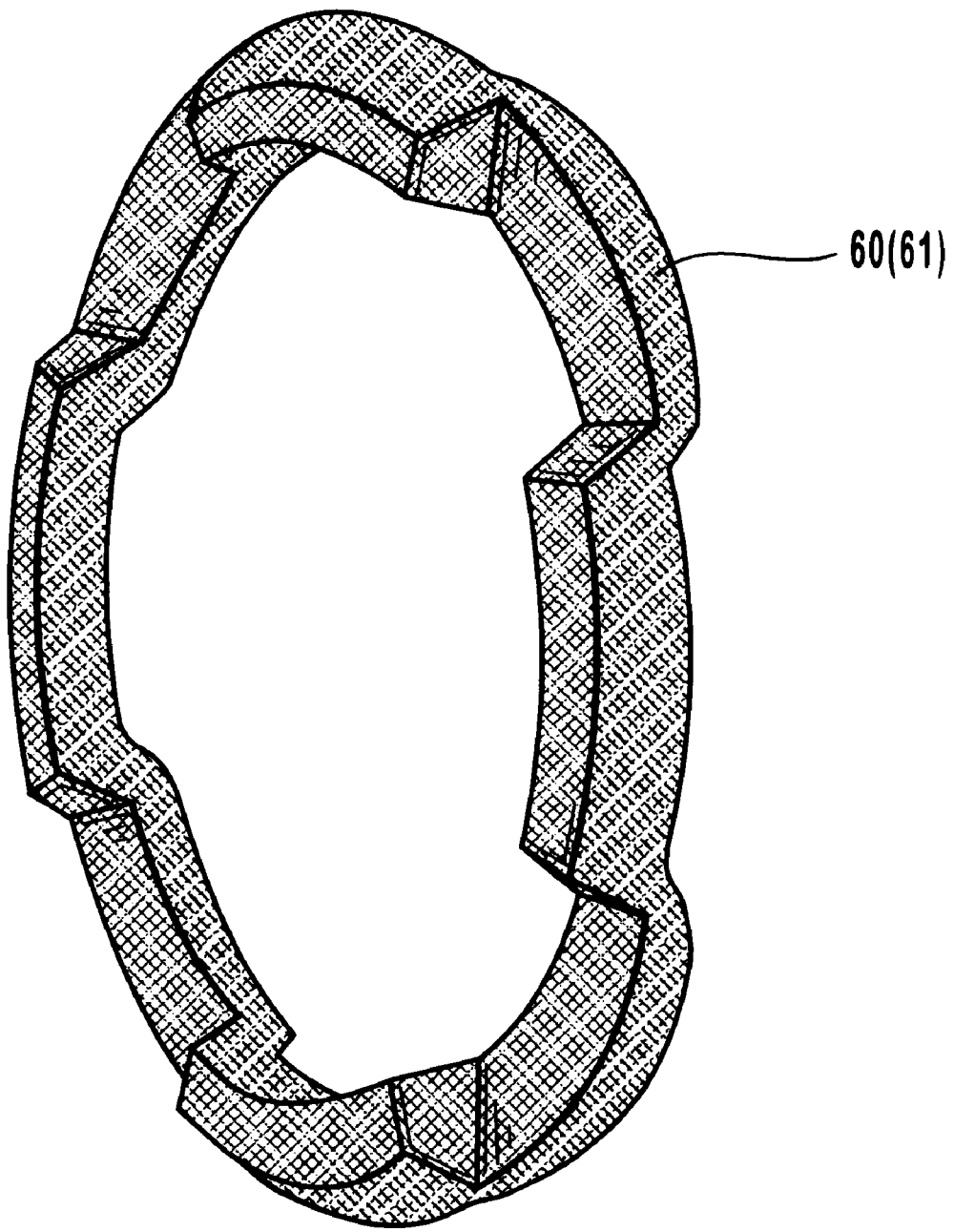
FIG. 7 is a perspective view of another preferred embodiment of the present invention, showing a ring shaped buffering member formed in a concavo-convex (meaning concave in one area and convex in another) shape on both of its sides by compression molding.

Therefore, the buffering member (60)(61) is preferably made of a material with a relatively high density and less flexibility. As shown in FIG. 7, in another preferred embodiment of the present invention, a ring shaped buffering member (61) is located in the second pocket and formed in a convaco-convex shape on both of its sides (preferably by compression molding) in order to improve its restitutive force and to reduce friction noise during bending. It is also preferable to apply a lubricating coating on the contacting surface of the guiding member (30) and/or the buffering member (60)(61) to lessen the friction and to provide a smooth movement.

According to an experiment, the maximum angle of engine roll causes the angle of displacement of the decoupler to be approximately 8 degrees. The allowable degree of bending displacement should be designed to absorb all bending motion within the maximum range of motion of engine roll. To limit the range of angular displacement of the coupler to approximately 8 degrees, the inner side of bending point of the guiding member (30) is designed to have maximum of 8 degrees of movement along with the outer surface of the inner buffering member (60). FIG. 4 and FIG. 5 depict this principle. However, the maximum degree (q) can be varied depending on different usage, but will require variation of parts dimensions.

For the purposes of this patent, the term "proximal" will be used to indicate an orientation toward the engine, and "distal" will be used to indicate an orientation toward the exhaust pipe. For example, the guiding member 30 of the cover 20 is situated at the proximal end of the cover 20 (the end closest the engine), while the opening of the sleeve 10 within the coupler is distal with respect to the engine (i.e., on the muffler side of the coupler).

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An exhaust coupler comprising:

a conduit-type sleeve connected to the engine to pass the exhaust gas therethrough;

a conduit-type cover member installed about the exterior of said sleeve;

a guiding member extended from one end of said cover member, said guiding member serving to guide any bending action of the decoupler;

an inner retainer pocket having a rim engaged located outside said sleeve and inside said cover, wherein said rim extended circumferentially outward and forms a first pocket with said guiding member;

an outer retainer member, wherein said outer retainer member is installed about outer surface of said inner retainer member and forms a second pocket with said guiding member;

a first buffering member located in said first pocket;

a second buffering member located in said second pocket;

wherein at least one of said buffering members is ring-shaped; and a bellows fixably engaged between said inner retainer member and said cover member, wherein said bellows prevents leakage of the gas therein and absorbs elastic and bending displacement experienced by the decoupler.

2. A coupler as recited in claim 1, wherein said guiding member is curved inwardly and radially toward said sleeve.

3. A coupler as recited in claim 1, wherein said guiding member is circumferentially curved toward said sleeve along a circle having a diameter R and a displacement center C.

4. A coupler as recited in claim 1 wherein at least one of said buffering members is formed in a concavo-convex shape.

5. A coupler system for a motor vehicle, the motor vehicle including an engine, an exhaust system decoupler situated to receive exhaust gas from the engine, and an exhaust pipe situated to receive exahaust gas from the decoupler and transmit it to a muffler, the decoupler system comprising:

a sleeve through which exhaust gas travels from the engine to the decoupler, a bellows located at least partially in circumferential orientation about the exterior of at least a portion of said sleeve, said bellows being adapted to accommodate both axial and radial displacement of the exhaust pipe with respect to the decoupler, a cover shaped to cover said bellows, said cover having a proximal end and a distal end, an inner retainer located to be proximate said the exterior of sleeve and proximate said bellows, at least a portion of said inner retainer being located inside of said cover an outer retainer located to be proximate the proximal end of said cover, a guiding member located on the proximal end of said cover, said guiding member being situated between a portion of said inner retainer and a portion of said outer retainer, a first pocket located between a portion of said inner retainer and said guiding member, a second pocket located between a portion of said outer retainer and said guiding member, and a concavo-convex shaped buffering member located in said second pocket.

6. A coupler as recited in claim 5 further comprising a lubricating coating on said buffering member.

7. A coupler as recited in claim 6 wherein said buffering material is resilient, serves to absorb vibrations, and tends to return to its original shape after experiencing a displacing force.

8. A coupler as recited in claim 7 wherein said buffering material comprises compressed iron net.

9. A coupler as recited in claim 5 wherein a quantity of lubricant is present along surfaces of said guiding member or said buffering member in order to facilitate sliding travel of said guiding member with respect to said first and said second pockets.

10. A coupler as recited in claim 6 wherein said inner retainer has a flange that extends in a radially outward direction and is located within said cover, said flange serving to retain buffering material between said flange and said guiding member.

11. A coupler as recited in claim 5 further comprising buffering material located between said outer retainer and said guiding member, said outer retainer serving to keep buffering material adjacent said guiding member.

12. A coupler as recited in claim 5 further comprising buffering material located in said first pocket and in said second pocket, said buffering material serving to absorb shock and vibration;

wherein said guiding member is situated at an obtuse angle with respect to the main portion of said cover.

13. A coupler as recited in claim 5 further comprising buffering material located in said first pocket and in said second pocket, said buffering material serving to absorb shock and vibration;

wherein said guiding member is situated at an obtuse angle with respect to the main portion of said cover.

14. A coupler as recited in claim 5 further comprising buffering material located in said first pocket and in said second pocket, said buffering material serving to absorb shock and vibration.

15. A coupler as recited in claim 14 wherein said guiding member is formed in a curvilinear shape.

16. A coupler as recited in claim 14 having a compression center C located along the longitudinal axis of the sleeve and being the point about which bending articulation of the decoupler takes place; wherein said guiding member is located a distance R from compression center C, such that during bending articulation of the decoupler causes said guiding member to move along an arc of a circle defined by center C and radius R.

17. A coupler as recited in claim 16 wherein said guiding member is arcuate in shape.

18. A coupler as recited in claim 17 wherein said buffering material serves to facilitate sliding movement of said guiding member.

19. A coupler as recited in claim 18 wherein said bellows is corrugated.

20. A coupler as recited in claim 16 wherein said bellows tends to return to its original shape after experiencing a displacement.

* * * * *